US 11,248,932 B2

(12) United States Patent
Vissiere et al.

(10) Patent No.: US 11,248,932 B2
(45) Date of Patent: Feb. 15, 2022

(54) METHOD FOR CALIBRATING MAGNETOMETERS OF AN OBJECT

(71) Applicant: SYSNAV, Vernon (FR)

(72) Inventors: David Vissiere, Paris (FR); Mathieu Hillion, Vernon (FR); Hendrik Meier, Vernon (FR)

(73) Assignee: SYSNAV, Vernon (FR)

( * ) Notice: Subject to any disclaimer, the term of this patent is extended or adjusted under 35 U.S.C. 154(b) by 0 days.

(21) Appl. No.: 16/973,950

(22) PCT Filed: Jun. 12, 2019

(86) PCT No.: PCT/FR2019/051414
§ 371 (c)(1),
(2) Date: Dec. 10, 2020

(87) PCT Pub. No.: WO2019/239062
PCT Pub. Date: Dec. 19, 2019

(65) Prior Publication Data
US 2021/0247206 A1 Aug. 12, 2021

(30) Foreign Application Priority Data
Jun. 13, 2018 (FR) ...................................... 1855160

(51) Int. Cl.
*G01C 25/00* (2006.01)
*G01C 19/5776* (2012.01)
(52) U.S. Cl.
CPC ......... *G01C 25/00* (2013.01); *G01C 19/5776* (2013.01)
(58) Field of Classification Search
CPC .. G01C 25/00; G01C 19/5776; G01C 21/165; G01C 17/38; G01C 21/188
See application file for complete search history.

(56) References Cited

U.S. PATENT DOCUMENTS

2002/0100178 A1 8/2002 Smith et al.
2004/0123474 A1 7/2004 Manfred et al.
(Continued)

FOREIGN PATENT DOCUMENTS

FR 3069649 A1 2/2019

OTHER PUBLICATIONS

International Preliminary Report on Patentability for PCT Patent Application No. PCT/FR2019/051414, dated Dec. 24, 2020, 15 pages (8 pages of English Translation and 7 pages of Original Document).
(Continued)

*Primary Examiner* — David J Bolduc
(74) *Attorney, Agent, or Firm* — Womble Bond Dickinson (US) LLP (57) ABSTRACT

The present invention relates to a method for calibrating magnetometers (20) of an object (1) moving in an ambient magnetic field, the method being characterised in that it comprises the steps of:
  (a) Acquisition
    by the magnetometers (20), of at least three measured components of the magnetic field around the magnetometers (20), and
    by inertial measurement means (11) which are secured to the object (1), of an angular velocity of the object (1);
  (c) Determination, by data processing means (21), of values of at least one calibration parameter of the magnetometers (20) minimising an expression defined by estimated components of the magnetic field and at least one magnetic equation relating to the angular velocity of the object (1),
    the estimated components of the magnetic field being a function of the measured components of the magnetic field as well as of calibration parameters of the magnetometers (20), and
(Continued)

the at least one magnetic equation assuming that the magnetic field is uniform and stationary around the magnetic measurement means (20).

13 Claims, 2 Drawing Sheets

(56) References Cited

U.S. PATENT DOCUMENTS

| | | | |
|---|---|---|---|
| 2011/0178707 A1 | 7/2011 | Sachs et al. | |
| 2011/0241656 A1* | 10/2011 | Piemonte | G01C 17/38 |
| | | | 324/207.11 |
| 2012/0116716 A1 | 5/2012 | Lokshin et al. | |
| 2012/0203486 A1 | 8/2012 | Almalki et al. | |
| 2012/0259572 A1* | 10/2012 | Afzal | G01C 21/165 |
| | | | 702/92 |
| 2013/0018582 A1* | 1/2013 | Miller | G01C 17/38 |
| | | | 701/501 |
| 2013/0073253 A1* | 3/2013 | Handa | G01R 33/0206 |
| | | | 702/152 |
| 2014/0122015 A1* | 5/2014 | Handa | G01C 21/165 |
| | | | 702/141 |
| 2014/0257731 A1* | 9/2014 | Konda | G01C 25/00 |
| | | | 702/89 |
| 2017/0336208 A1* | 11/2017 | Korogi | G01C 21/165 |
| 2018/0372499 A1* | 12/2018 | Ali | G01C 21/165 |
| 2020/0225041 A1* | 7/2020 | Boka | G01R 33/032 |
| 2020/0370889 A1* | 11/2020 | Eitel | G01C 21/206 |

OTHER PUBLICATIONS

International Search Report and Written Opinion received for PCT Patent Application No. PCT/FR2019/051414, dated Oct. 31, 2019, 17 pages (8 pages of English Translation and 9 pages of Original Document).

Preliminary Research Report received for French Application No. 1855160, dated Feb. 21, 2019, 5 pages (1 page of French Translation Cover Sheet and 4 pages of original document).

* cited by examiner

METHOD FOR CALIBRATING MAGNETOMETERS OF AN OBJECT

TECHNICAL FIELD GENERAL

The present invention relates to the field of navigation without GNSS.

More precisely, it relates to a method for calibrating magnetometers which are secured to a gyrometer.

STATE OF THE ART

It is today common to track the position of a vehicle via GNSS (Global Navigation Satellite System, for example GPS) or by using a communication network (triangulation using emitting terminals, wifi network or others).

These methods are very limited because they do not make it possible to ensure availability and precision of the information, one and the other being affected by any maskings between the sources and the receiver. They are also dependent on external technologies such as satellites for GNSS which may be unavailable and even voluntarily scrambled.

Alternatively, "autonomous" methods are also known to track in any environment the relative displacement of a vehicle thanks to an inertial or magneto-inertial unit. "Relative displacement" means the trajectory of the vehicle in space with respect to a point and a data marker at initialisation. In addition to the trajectory, these methods also make it possible to obtain the orientation of the vehicle with respect to the same initial marker.

A navigation class inertial unit is formed at least from three accelerometers and from three gyrometers with a tri-axis arrangement. Typically, the gyrometers "maintain" a marker, wherein a double temporal integration of the measurements of accelerometers make it possible to estimate the movement.

It is in particular known that in order to be able to use the conventional inertial navigation methods, such as implemented in complex applications such as the navigation of fighter planes or commercial aircraft, submarines, vessels, etc., it is necessary to use very high-precision sensors.

However, such high-precision sensors are expensive, heavy and bulky, and therefore not suitable for general public applications.

Consequently low-cost sensors are thus used, which have substantial risks of error, for which the calibration (process which makes it possible to identify then remove the defects of the sensor measurements) is therefore a critical process.

Methods for calibrating magnetometers using a gyrometer are known.

Application US2012/0116716 proposes to examine if the change in a magnetic field between two measurement points corresponds to the predicted change in attitude by the integration of gyrometers. It however makes the assumption that the magnetometric/accelerometric measurements are reliable, which is delicate when the system is on board a vehicle. Indeed, it is observed in practice that:
- the ambient magnetic field is not always homogeneous and stationary;
- the metallic elements (for example bodywork) or magnets in the vicinity have an impact on the magnetic measurement (soft iron and hard iron effects), see also application US20040123474.

To correctly calibrate a magnetometer, it is necessary to place it in a maximum of spatial orientation so as to "excite the error model" in order to have observability. This problem is easily resolved for a piece of equipment that can be carried by hand in the case where a calibration is made before using it (it is turned in all directions, see for example application FR1757082). If the magnetometer is fitted on a vehicle, there is a limitation:
- by the fact that during a typical travel of a vehicle, roll and pitch deviate from zero only slightly.
- by the fact that the body becomes magnetised, or the fact that the vehicle is loaded, which means that the calibration may no longer be pertinent; which will require regular recalibration.

Application US2011/0178707 more precisely relates to devices of the smartphone type that comprise a magnetic compass and a gyrometer, and mentions the problem of magnetic disturbances. This application aims rather the calibration of the magnetic compass using gyrometric data, but also proposes the reverse, taking as a point of departure a magneto-accelerometric quaternion q and by obtaining the recalibration angular velocity from this quaternion $\omega=2q^{-1}q'$. However, the assumption is still made that the magnetometric/accelerometric measurements are reliable, and in the opposite case it is simply proposes to not update the bias of the gyrometer as long as this situation lasts, or to use a default quaternion stored in a memory.

It would be desirable to have a new method for calibrating magnetometers of an object for the purpose of estimating the movement of this object that allows for excellent quality of the result and is not restrictive.

PRESENTATION OF THE INVENTION

The present invention thus relates, according to a first aspect, to a method for calibrating magnetometers of an object moving in an ambient magnetic field, the method being characterised in that it comprises the steps of:
(a) Acquisition
 by the magnetometers, of at least three measured components of the magnetic field around the magnetometers, and
 by inertial measurement means which are secured to the object, of an angular velocity of the object;
(c) Determination, by data processing means, values of at least one calibration parameter of the magnetometers minimising an expression defined by estimated components of the magnetic field and at least one magnetic equation relating to the angular velocity of the object, the estimated components of the magnetic field being a function of the measured components of the magnetic field as well as of calibration parameters of the magnetometers, and
 the at least one magnetic equation assuming that the magnetic field is uniform and stationary around the magnetic measurement means.

According to other advantageous and non-limiting characteristics:
- the estimated components $M^{(estimation)}$ of the magnetic field are linked to the measured components $M^{(measurement)}$ by a model $M^{(measurement)} = A \cdot M^{(estimation)} + b_{magneto}$, where A and $b_{magneto}$ are the calibration parameters of the magnetometers;
- the method further comprises a step (b) of estimating a parameter representative of an error on the calibration parameters, the step (c) being implemented if said parameter representative of an error is greater than a predetermined threshold;
- the method further comprises a step (d) of anew estimation of said parameter representative of an error on the calibration parameters in such a way as to distinguish an external magnetic disturbance from a change in the magnetic properties of the object;

the method further comprises, if at the end of step (d) said parameter representative of an error is less than a predetermined threshold, a step (e) of determining an attitude subset of the object for which the calibration is pertinent;

step (c) comprises the implementation of a recursive filter or of an optimisation;

the inertial measurement means are a gyrometer, the angular velocity of the object acquired in step (a) being a measured angular velocity, and that used by the magnetic equation or equations is an estimated angular velocity according to the measured angular velocity and calibration parameters of the gyrometer, step (c) also comprising the determination of values of at least one calibration parameter of the gyrometer;

the estimated angular velocity $\omega_{gyro}^{(estimation)}$ of the object is linked to the measured angular velocity $\omega_{gyro}^{(measurement)}$ by a model $\omega_{gyro}^{(estimation)} = D \cdot (\omega_{gyro}^{(measurement)} + b_{gyro})$, where $D$ and $b_{gyro}$ are the calibration parameters of the gyrometer;

the magnetic equation is of the form $\dot{M} = -\omega \times M$, where M is the vector of the components of the magnetic field, and $\omega$ the angular velocity;

said expression is a function of $|\dot{M}^{(estimation)} + \omega_{gyro}^{(estimation)} \times M^{(estimation)}|$;

said parameter representative of an error on the calibration parameters is either the mean of $|\dot{M}^{(estimation)} + \omega_{gyro}^{(estimation)} \times M^{(estimation)}|^2$ over a given time interval, or a spatial gradient of said components of the magnetic field;

the method comprises a step (f) of estimating, by the data processing means, the movement of said object according to the angular velocity of the object, measured components of the magnetic field, and values of the calibration parameters.

According to a second aspect, an object moving in an ambient magnetic field is proposed, comprising inertial measurement means configured to acquire an angular velocity of the object, magnetometers configured to acquire at least three components of the magnetic field, the object being characterised in that it further comprises data processing means configured to:

determine the values of at least one calibration parameter of the magnetometers minimising an expression defined by estimated components of the magnetic field and at least one magnetic equation relating to the angular velocity of the object, the estimated components of the magnetic field being a function of the measured components of the magnetic field as well as of calibration parameters of the magnetometers, and the at least one magnetic equation assuming that the magnetic field is uniform and stationary around the magnetic measurement means.

According to a third and a fourth aspect, are proposed a computer program product comprising code instructions for the execution of a method according to the first aspect of magnetometer calibration; and a storage means readable by a piece of computer equipment whereon a computer program product comprises code instructions for the execution of a method according to the first aspect of magnetometer calibration.

PRESENTATION OF THE FIGURES

Other characteristics and advantages of the present invention shall appear when reading the following description of a preferred embodiment. This description will be given in reference to the accompanying drawings wherein.

DETAILED DESCRIPTION

Architecture

Figure 1:
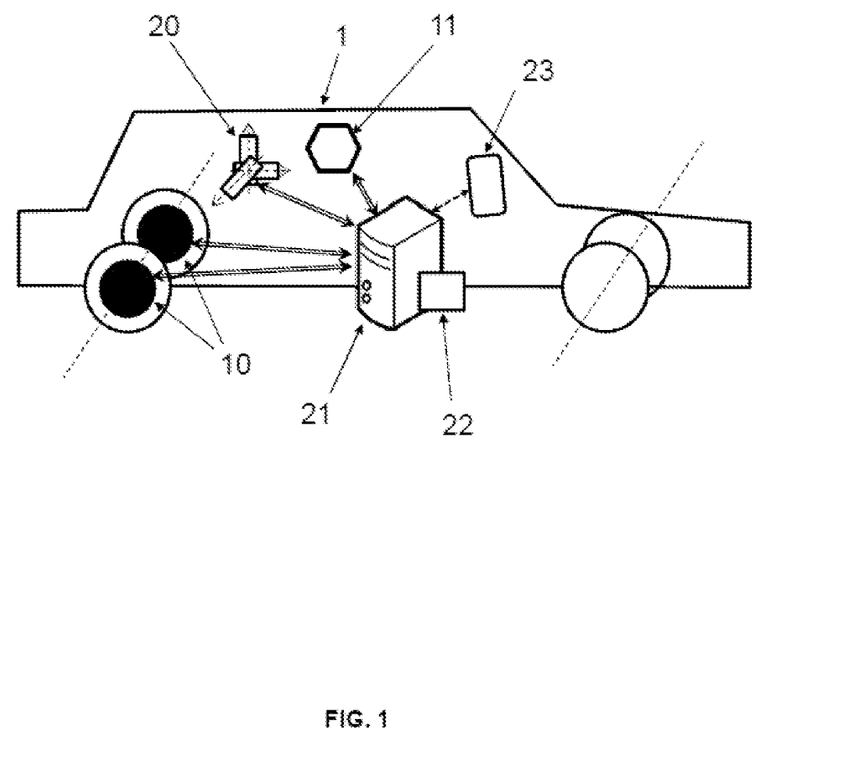
FIG. 1 shows a vehicle architecture example for the implementation of the method according to the invention.

In reference to FIG. 1, the present method allows the calibration of magnetometer 20 of an object 1 moving in an ambient magnetic field (typically the terrestrial magnetic field, where applicable altered by nearby metallic objects), noted as M. As already explained, the magnetic field is a vector field in three-dimensional space, i.e. associating a three-dimensional vector with each three-dimensional point wherein the object 1 is movable.

This object 1 can be any movable object for which knowledge of the position is desired, for example a vehicle, in particular a vehicle with wheels, a drone, etc., but also a person or a portion of the body of this person (their hands, their head, etc.).

The magnetometer or magnetometers 20 are secured to the object 1, and are "axial", i.e. cable of measuring a component of said magnetic field, i.e. the projection of said magnetic field vector M along their axis.

The magnetometers 20 are at least in the number of three so as to be able to acquire 3 components of the magnetic field. Advantageously the magnetometers are even at least in the number of 8 or even 9, advantageously organised by groups of three in "tri-axes", i.e. a triplet of orthogonal two-by-two magnetometers 20 associated with the same spatial position and measuring the magnetic field along the three axes.

Preferably, the orthonormed system associated with the object is chosen by convention (and by facility for the rest of the present description) such as tri-axes are advantageously oriented in accordance with said orthonormed system, in such a way as to facilitate the calculations.

But those skilled in the art will know in any case how to transpose to any spatial arrangement of magnetometer.

The object 1 is furthermore provided with inertial measurement means 11 able to measure the angular velocity of the object (for example secured to the bodywork in the case of a vehicle, and generally fixed in the reference frame of the object 1) according to a system of three orthogonal axes, that define the object marker. The means 11 preferably consist of one or more gyrometers, but can also be formed from one or more gyroscopes or any other source of attitude or of angular velocity (3D).

In the preferred embodiment where the object 1 is a vehicle, the rotation about the vertical axis of the vehicle is described by the angle on which the driver acts by turning the steering wheel. On a generally flat ground, the changes in direction of the vehicle are in the horizontal plane, i.e. also according to said vertical axis. In reality, non-zero values for the roll (rotation along the longitudinal axis of the vehicle) and the pitch (rotation along the transversal axis of the vehicle) can be the result for example of a sloped road but are typically low.

The object 1 can advantageously furthermore be provided with "additional" acquisition means 10 of a measured linear velocity of the object 1 (noted as V), i.e. of the displacement. These means 10 can directly or indirectly make it possible to obtain the linear velocity, and thus be of many types, for example inertial measurement means. Thus the gyrometer or gyrometers 11 can be supplemented by one or more accelerometers, and even the object 1 can comprise an inertial unit with at least three accelerometers and three gyrometers in a tri-axis arrangement.

Alternatively, the means 10 can consist, if the object 1 is a vehicle with wheels, of at least two odometers each for a wheel of the vehicle, for example the two rear wheels, as shown in the example of FIG. 1. Note that a set of odometers is a simple and reliable means for obtaining a simple linear velocity.

The object 1 further comprises as explained processing means 21 (typically a processor) for the implementation directly in real time of the processing of the present method, for example an on-board computer of a vehicle, and optionally a memory 22, and an interface 23 to return information on the movement of the object 1 (an instant velocity value, a heading, a position on a map, etc.), and/or send commands to the object 1. The object 1 can as such be in particular an autonomous vehicle, and the processing means 21 configured to implement the autonomous navigation of the vehicle. Thus, said commands are sent to the control members of the vehicle (engine, actuators of the steering wheel, etc.) so as to simulate the driving by a driver.

Note that the processing means 21 can be external to the object 1, and for example connected to the latter by a wireless network. Alternatively, the inertial measurement means 11 and the magnetometers 20 can be connected to the data processing means 21 in particular with wires, for example via Ethernet.

Method

The present method is a method for calibrating at least the magnetometers 20. "Calibration" means the determining of one or more calibration parameters, of which a list is provided hereinbelow. In particular, certain calibration parameters can be considered as reliable and predetermined, and others to be determined. Regarding those that are to be determined, it can be provided that they have "current" values (in other terms a calibration has already taken place), and that these values will where applicable be modified (in case of a new calibration).

It is supposed that the magnetometers 20 themselves are a prior perfectly calibrated (which means that all magnetic disturbances linked to the magnetometers are themselves identified and corrected), it is only their direct environment (bodywork, etc.) that has to be corrected in calibration so as to be able to estimate the terrestrial magnetic field that would be measured in the absence of the object 1.

In a particularly preferred embodiment, the method can furthermore be a method for calibrating inertial measurement means 11, i.e. the gyrometer or gyrometers 11 and the magnetometers 20 can be calibrated simultaneously. This is an extremely advantageous mode, since as shall be seen there is even no more need to assume that one among the gyrometer or the magnetometer is reliable to use it as a reference for calibrating the other the two automatically calibrate each other. Alternatively, it will naturally be possible to consider the gyrometer 11 as well calibrated and to calibrate the magnetometers 20 consequently, which makes it possible for example to calibrate more parameter of the magnetometers 20.

As shall be seen, in an advantageous embodiment the present method is even a method for estimating the movement of the object 1, i.e. it comprises following the calibration, the use of calibrated measurements in order to reliably deduce therefrom one or more components of the movement.

In a first step (a), the method comprises the acquisition by the inertial measurement means 11 of an angular velocity of the object 1, noted as $\omega_{gyro}^{(estimation)}$, and by the magnetometers 20, of at least three components of the magnetic field. These components are more precisely so-called measured components, forming a vector noted as $M^{(measurement)}$. Preferably, three components of the angular velocity and at least eight magnetic components are acquired (advantageously three magnetometric tri-axes position in the corners pf a rectangular isosceles triangle), in such a way as to be able to deduce therefrom the field and its gradient (i.e. the derivatives to the following order according to the three axes).

These magnitudes are advantageously measured with a sampling dt (i.e. every "dt" seconds) withy dt very small before the characteristic time of the movements of the object 1, typically 40 ms.

In a step (c) (as shall be seen hereinafter the method advantageously comprises an intermediate step (b), but the latter remains optional), the data processing means 21 determine the values of at least one calibration parameter of the magnetometers 20 minimising an expression defined by estimated components of the magnetic field and at least one magnetic equation relating to the angular velocity of the object 1.

The idea is to separately estimate gyrometric data and magnetic data which are theoretically linked by a magnetic equation. Thus thanks to the equation a quantity that ideally should be zero can be expressed (i.e. the gyrometric and magnetic data exactly satisfy the magnetic equation), otherwise it is the calibration that has to be perfected.

The estimated components of the magnetic field, noted as $M^{(estimation)}$, are according to the measured components of the magnetic field $M^{(measurement)}$ and calibration parameters of the magnetometer 20.

Preferably, they are linked to the measured components $M^{(measurement)}$ by a model $M^{(measurement)} = A \cdot M^{(estimation)} + b_{magneto}$, where the matrix 3×3 A and the vector $b_{magneto}$ are the calibration parameters of the magnetometers 20. Wherein it is rather the estimated component that one wants to express as a function of the measured component, it is possible to write $M^{(estimation)} = A^{-1} \cdot (M^{(measure)} - b_{magneto})$.

$b_{magneto}$ is generally representative of the "hard iron type" effects, and the matrix A representative of the "soft iron type" effects. These effects correspond to the hard/soft iron effects strictly speaking and can also include phenomena with the same impact but a different cause (for example effects due to the electronics/physics of the magnetometer).

Note that more generally, it is possible to examine a general error model: $M^{(estimation)} = h(M^{(measurement)})$ with h a function (application) that is not necessarily fine-tuned.

In the linear case ($M^{(measurement)} = A \cdot M^{(estimation)} + b_{magneto}$), A is a 3×3 matrix, that can be written as $A = R \cdot \bar{A}$ with R orthogonal and higher triangular $\bar{A}$.

Recall that it is assumed that the magnetometers 20 themselves are a priori perfectly calibrated, it is only their direct environment (bodywork, etc.) which has to be corrected in calibration so as to be able to estimate the terrestrial magnetic field that would be measured in the absence pf the object 1. The matrix R is therefore important and to be determined in such a way that the object magnetic marker remains stable.

The conventional calibration methods with respect to spheres determine R only at one rotation about the nearest axis (see document E. Dorveaux, D. Vissiere, A. P. Martin, N. Petit, "*Iterative calibration method for inertial and magnetic sensors*" in *Proc. of the 48th IEEE Conf. on*

*Decision and Control* 2009). The sensor axes do not remain fixed after the application of these methods.

It is possible in practice to determine 8 coefficients of A in calibration (one coefficient, the global scale factor that connects the measurement to the physical unit in Tesla (or Gauss), cannot be determined, but, at the same time, it is not necessary to know it for a certain number of applications (ex: use of magnetometers to determine the heading of an object). Note that it remains advantageously desirable to store the value (mean) of the normal of the field during the calibration (with respect to the chosen scale factor), see further on.

As explained, the angular velocity acquired in step (a) is preferably a measured velocity (i.e. potentially vitiated with errors), and that used by said magnetic equation is an estimated velocity, noted as $\omega_{gyro}^{(estimation)}$ according to the measured velocity and calibration parameters of the inertial measurement means 11.

Preferably, in particular in the case where the means 11 are a gyrometer, in general $\omega_{gyro}^{(estimation)} = g(\text{measurement})$ with g a function (application) that is determined by the calibration parameters. In the simplest case, g is fine-tuned and the estimated angular velocity $\omega_{gyro}^{(estimation)}$ is linked to the measured angular velocity $\omega_{gyro}^{(measurement)}$ by the formula $\omega_{gyro}^{(estimation)} = D \cdot (\omega_{gyro}^{(measurement)} + b_{gyro})$, where D and $b_{gyro}$ are the calibration parameters of the gyrometer 11.

In the case of a three-dimensional attitude, $b_{gyro}$ is a bias vector and D is a 3×3 matrix (orthogonal matric for transfer at the correct marker)×(higher triangular matrix containing the scale factors and the calibrations). In a simplified manner, it is possible for example to consider that D is predetermined (in practice it varies very slowly) and that the only calibration parameter to be determined for the gyrometer 11 is $b_{gyro}$, which effectively tends to vary over time (referred to as the drift of the gyrometer 11).

In a particularly preferred embodiment of simultaneous double calibration, there are only three calibration parameters to be determined: $b_{gyro}$, A and $b_{magneto}$. This limited number of parameters makes such a double calibration possible when the object 1 has a "varied" trajectory (directions/velocities that vary as a function of time).

Magnetic Equation

The change in the magnetic field in the body marker (i.e. the marker of the object 1) over time is described by the equation $$\dot{M} = -\omega \times M + \nabla M \cdot V + \frac{\partial M}{\partial t}.$$

The first term $-\omega \times M$ describes the change in the field in the body marker which is due to the rotation of this marker with respect to the fixed marker. The second term $\nabla M \cdot V$ describes the change in the measured field coming from the translation in a region with an inhomogenous field. Finally, the third term $$\frac{\partial M}{\partial t}$$

takes the non-stationarities of the magnetic field into account (for example the periodical currents such as 50 Hz in Europe or movements of a magnet/an object made of steel in the vicinity of said object, etc.).

If there is no "movable" magnetic disturbance, i.e. the magnetic field has a stationary nature, $$\frac{\partial M}{\partial t} \approx 0,$$

and the equation can be reduced to $\dot{M} = -\omega \times M + \nabla M \cdot V$.

If there is no magnetic disturbance at all, i.e. the magnetic field has a uniform nature in addition to be stationary, $\nabla M \approx 0$ and the equation can even be reduced to $\dot{M} = -\omega \times M$.

This double assumption of uniformity and stationarity is normally the most often verified. Indeed, for the terrestrial magnetic field, uniformity is locally observed as a very good approximation in our latitudes, except in the cases of the presence for example of a metallic structure or made of reinforced concrete (typically a bridge) in the surrounding area. The non-stationarities due to the displacements objects in the vicinity are even rarer because the sources of the disturbances would have to move, and any non-stationarities due to periodical currents are on the average zero can also process it with estimation techniques, see for example document C.-I. Chesneau, M. Hillion, and C. Prieur, *Motion estimation of a Rigid Body with an EKF using Magneto-Inertial Measurements*, 7th Conf. on Indoor Positioning and Indoor Navigation (IPIN '16), Madrid, Spain, 2016.

Figure 2:
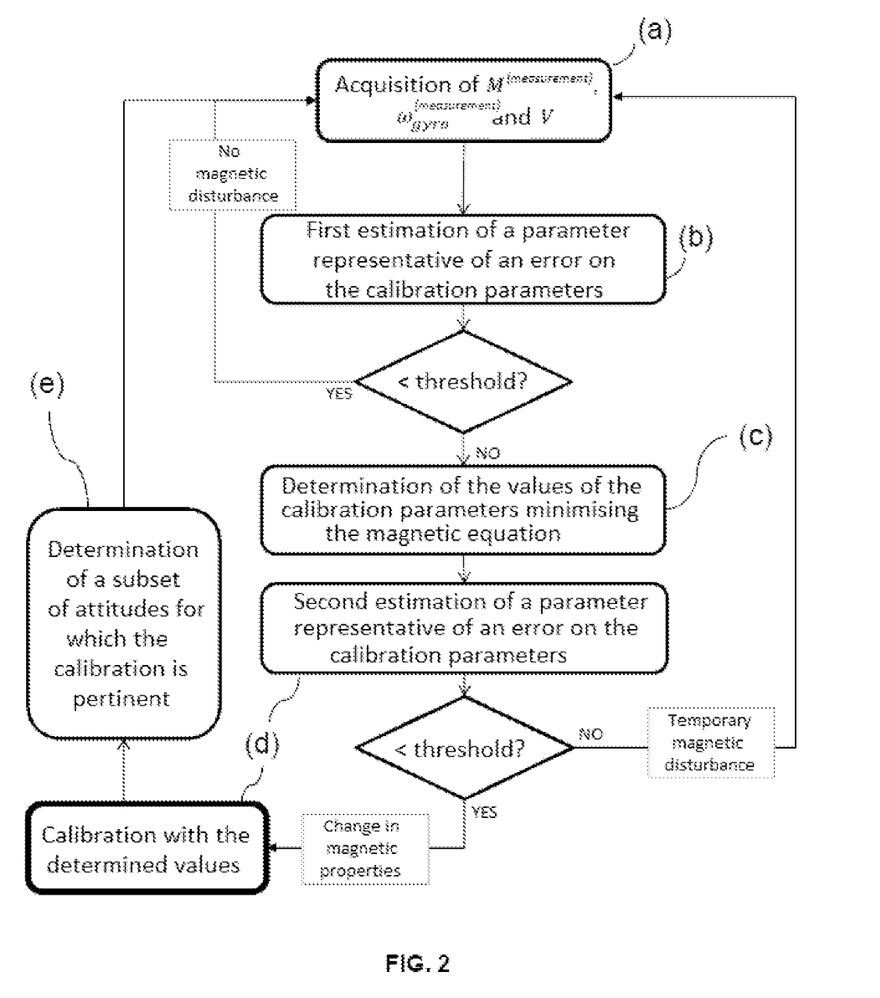
FIG. 2 is a diagram showing the steps of a preferred embodiment of the method according to the invention.

Then, in reference to FIG. 2, in step (c) it shall be attempted to calibrate the magnetometers 20 by taking the double assumption of uniformity and of stationarity of the field. The implementation of step (c) can be preceded by a step (b) of estimating a parameter representative of an error on the calibration parameters, the step (c) being implemented if this parameter is greater than a predetermined threshold, i.e. shows that the magnetometers 20 need a calibration.

The method then advantageously comprises an optional step (d) of estimating (first or second estimation according to whether the method comprises the step (b)) said parameter representative of an error on the calibration parameters thanks to which the absence of disturbances is verified, i.e. the pertinence of the assumptions.

It is therefore understood that in a double assumption of stationarity and uniformity of the magnetic field around the magnetometers 20, the quantity $\dot{M}^{(estimation)} + \omega_{gyro}^{(estimation)} \times M^{(estimation)}$ is equal to zero for calibration errors and nearest noise.

Advantageously, the first expression (minimised in step (c)) is a function of $\dot{M}^{(estimation)} + \omega_{gyro}^{(estimation)} \times M^{(estimation)}$, and preferably of $|\dot{M}^{(estimation)} + \omega_{gyro}^{(estimation)} \times M^{(estimation)}|$ or of $(\dot{M}^{(estimation)} + \omega_{gyro}^{(estimation)} \times M^{(estimation)})^2$.

Under generic conditions, the minimisation of these expressions will give the parameters without ambiguity for a generic trajectory. It is understood however that alternatively those skilled in the art can use as a first/second expression any other functional sensitive to differences in relation to the relation defined by the first/second equation (normal $L^2$, $L^\infty$, etc.).

To implement this minimisation, the data processing means 21 can work over time on an interval of a given length. As such, in a known manner a recursive filter (RLS, recursive least squares, etc. methods) or an optimisation (least square method, etc.) can be used.

For example, in the assumption where the calibration parameters of the magnetometers 20, i.e. the parameters A and $b_{fer\_dur}$ are simultaneously determined, it is possible to implement a so-called differential calibration principle wherein $\int |M^{(estimation)} + \omega_{gyro}^{(estimation)} \times M^{(estimation)}|^2 dt$ is minimised with $\omega_{gyro}^{(estimation)} = D \cdot (\omega_{gyro}^{(measure)} + b)$ and $M^{(estimation)} = A^{-1} \cdot (M^{(measurement)} - b_{fer\_dur})$ to the least squares.

In another example, it is possible to implement a so-called integral calibration principle. The idea is that after calibration, the measured field corresponds to the terrestrial field and has to be constant in the terrestrial marker (constant in normal and in direction), i.e. each component $M = R_{b \rightarrow t} M^{(estimation)}$ = constant (terrestrial field) with $R_{b \rightarrow t}$ the transfer matrix from the body marker to the terrestrial marker, determined from $\omega_{gyro}^{(estimation)}$. The sum of the variances $(M_x) + \text{var}(M_y) + \text{var}(M_z)$ is minimised $$\left( \text{with } \text{var}(M_x) = \frac{1}{N-1} \sum_j (M_x^{(j)} - \overline{M_x})^2 \right)$$

and mutatis mutandis for the other variances) to find the least square calibration parameters. This method does not depend on the initial matrix $R_{b \rightarrow t}$.

Error Characterisation

As explained, the method advantageously comprises a step (b) and/or a step (d) of estimating a parameter representative of an error on the calibration parameters. As explained, in a preferred embodiment comprising both the step (b) and the step (d), the step (c) is implemented if said parameter representative of an error estimated in step (b) is greater than a predetermined threshold, and the step (d) is preferably implemented after each occurrence of the step (c).

The idea is to estimate the quality of the information provided by the magnetics 20 in order to discard cases that are hardly favourable to the calibration, i.e. cases of disturbances. As shall be seen, it is possible to distinguish two possible causes for exceeding the threshold:

i. an external disturbance (temporary) (for example a large structure made of steel/concrete next to which the vehicle is passing), which generates terms of the type $\nabla M \cdot V$ or $$\frac{\partial M}{\partial t}$$

in the magnetic equation.

ii. a change in the magnetic properties of the car (for example a change in the magnetisation of the shell of the vehicle, displacement of a magnetic object by a passenger).

The first occurrence of the estimation of the parameter representative of an error on the calibration parameters (step (b)) uses "original" calibration parameters, i.e. the current parameters at the moment when the method is started. The second occurrence of the estimation of the parameter representative of an error on the calibration parameters (step (d)) uses the parameters such as determined in step (c).

If at the end of step (b) said parameter representative of an error is less than said predetermined threshold, it is known that both the original calibration parameters can be kept and that there are no magnetic disturbances.

On the contrary, in the case of a parameter representative of an error greater than the threshold, this is one of the cases i. and ii. mentioned hereinabove. Then, implementing steps (c) and (d) makes it possible to distinguish these two cases.

Thus, if at the end of step (d) said parameter representative of an error is still greater than said determined threshold, the step (c) did not take place under favourable conditions and the result of the calibration is not accepted. More precisely, and as can be seen in FIG. 2, it can be concluded that the problem is due to a temporary external disturbance (case i), not to the calibration. The original calibration is then maintained for the attitude zone (see hereinbelow) for the future (for example for when the external disturbance has been distanced), i.e. the parameters of the former calibration are kept as calibration. The magnetic measurements can optionally be declared as unusable as long as the problem persists.

On the contrary, if said parameter representative of an error is now less than said predetermined threshold, it is because the case was ii, i.e. the cause of the problem was the original calibration, and step (d) comprises the calibration of the magnetometers 20 and/or of the inertial measurement means 11 with the values determined in step (c) of the calibration parameters.

Note that the determined values of the calibration parameters during an occurrence of step (c), but not used for the effective calibration, can be stored on the data storage means 12, and used during a future occurrence of the step (d). For example, it can be provided that as long as the parameter representative of an error is above the threshold, the determined calibration parameters are stored, and when passing below the threshold, the effective calibration also takes account of the stored values.

Generally, said parameter representative of an error on the calibration parameters is a function of the value of said expression to be minimised, calculated for the determined values of the calibration parameters.

A first embodiment of the step (b)/(d) is said to be intrinsic since it uses only magnitudes available in step (c). Preferably, estimation residues from step (c) are used, i.e. said parameter representative of an error is in particular the normal (for example $L^2$ or $L^\infty$) of the value of the first/second expression over a given time interval, typically $\int |M^{(estimation)} + \omega_{gyro}^{(estimation)} \times M^{(estimation)}|^2 dt$. In such a case, step (d) can be implemented at the same time with step (c). In the case of a recursive filter, the normal can be used (for example $L^2$ or $L^\infty$) of the innovation of the filter over a given period of time. Note that in the case of use of residues for step (b), it is possible to use any set of calibration parameters and any set of acquired data—there is no need for the parameters to be calculated using current acquired data (obtained during the last implementation of step (a)). As such, it is possible to characterise before (or even without) implementing step (c).

Alternatively, the deviation can be quantified in relation to a normal distribution, i.e. examine of the statistic distribution of the values of $M^{(estimation)} + \omega_{gyro}^{(estimation)} \cdot M^{(estimation)}$ is Gaussian or not, for example by calculating the higher moments.

According to a second embodiment, it is possible to calculate the normal of the estimated magnetic field, and compare it with a threshold: if the estimated magnetic field is abnormally high with respect to the reference value of the terrestrial field, this means there is a magnetic disturbance.

According to a third embodiment, it is very simply possible to estimate a spatial gradient of the components of the magnetic field, i.e. $\nabla M$.

Indeed, this estimation has to be close to zero so that the uniform nature is retained. It is desirable in this embodiment to have three magnetometric tri-axes, and in any case at least eight magnetometers 20, to determine the coefficients of the field as well as its gradient.

Alternatively or as a supplement, use can be made of learning to improve the estimation of this error parameter and/or develop an approach for identifying favourable conditions (i.e. stationary and uniform) in a more robust manner and with increased availability.

In particular, it is possible to implement learning mechanisms such as neural networks, machines with support vectors, nearest neighbour methods, decision trees, etc. Thus, at each occurrence of the steps (b) to (d), a learning base can be enriched wherein each dataset of measurements is "tagged" with the corresponding value of the parameter representative of an error, in such a way as to progressively (as the successive occurrences take place of steps (b) to (d)) and automatically learn to distinguish the acceptable calibrations from the unacceptable ones. Thus, the calibration is constantly improving itself.

Calibration Zone

In theory, there is only one calibration parameter set that corrects the defects in the measurement of the magnetic field for all the attitudes of the object 1.

In practice, along a typical path of a vehicle during a limited period of time, only a subset of the attitudes is explored. The optimisation for this attitude subset produces a set of calibration parameters which comes from a local minimisation (over the attitude subset considered). It may therefore be that this set of calibration parameters is not optimal outside the attitude subspace considered, which is called "calibration zone".

Preferably, the method further comprises, if said parameter representative of an error is less than a predetermined threshold, a step (e) of determining an attitude subset of the object for which the calibration is pertinent. Note that there may be several subsets retained for several calibrations.

This can make it possible to substantially improve the calibration: during the displacement of the object 1, two cases can be distinguished according to the current attitude:

i. If the attitude of the object 1 is not covered by any pertinent subset, it is possible to implement the present method or otherwise choose a default calibration arbitrarily.

ii. If the current attitude of the object 1 is covered by a pertinent subset, the adequate calibration for this zone is used.

Said subset can be characterised for example by Euler angle intervals, or by another parametrisation of the attitude variety (quaternions, orthogonal matrices).

Regarding the determination thereof, it can be determined by the convex envelope of the attitude data coming from all of the measuring points, or by all the measurements themselves.

Estimation of the Movement

As explained, the method advantageously comprises a step (f) of estimating by the data processing means 21 of the movement of said object 1 according to the angular velocity of the object 1 and/or of the components of the magnetic field, and/or of any measured linear velocity of the object 1 (by the means 10), and values of the calibration parameters, i.e. after recalibration. This step (f), which is not shown in FIG. 2 which focusses on the calibration, can be implemented continuously in parallel.

"Estimation of the movement" means in particular at least the estimation of an orientation of the object 1 (in the horizontal plane, i.e. a heading) and advantageously the estimation of a normal velocity. For this it is possible to either simply implement a navigation with the magnetic heading (i.e. "compass" style) obtained with the magnetometric measurements, or a gyrometric navigation or even a magneto-gyrometric merger in the case of double calibration. In the latter case the orientation is typically obtained by integration of the angular velocity.

Where applicable, the measured linear velocity (by the optional means 10) is used in step (f) only for determining a global velocity of the object 1.

The step (f) can further comprise the calculation according to said parameter representative of an error on the calibration parameters, of a magnetometric or gyro-magnetometric orientation error (cap). For example, the heading error accumulated during a period after a calibration can be estimated by the uncertainty in the estimation of the bias multiplied with the duration of this period.

Note that in a case of an autonomous vehicle, the step (f) can comprise the generation of a command of said vehicle 1 according to the estimated movement, in such a way as to take the vehicle 1 for example to a desired destination, or to stop the vehicle 1 by keeping it in a trajectory free of obstacles.

Equipment and Object

According to a second aspect, the invention in particular relates to a set of equipment 11, 20, 21 and optionally 10 for the implementation of one or the other of the embodiments of the method.

This set can be installed as a kit in a "conventional" object 1 in such a way as to transform it. Alternatively, in particular in the case where the object 1 is a vehicle, this can be an autonomous vehicle already provided with data processing means 21 for the navigation of the vehicle, as well as sensors such as the gyrometer 11 and/or odometers used as additional acquisition means 10.

An object 1 is in particular proposed, in particular of the vehicle with wheels type, comprising:
  inertial measurement means 11 (for example gyrometer) configured to acquire an angular velocity of the object 1;
  magnetometers configured to acquire at least three components of the magnetic field where applicable,
  optionally additional acquisition means 10 configured to acquire a measured linear velocity of the object 1 (advantageously odometers fitted on at least two of the wheels of the vehicle and configured to acquire measured velocities of said two wheels);
  data processing means 21 configured to
    determine the values of at least one calibration parameter of the magnetometers 20 minimising an expression defined by estimated components of the magnetic field and at least one magnetic equation relating to the angular velocity of the object 1,
      the estimated components of the magnetic field being a function of the measured components of the magnetic field as well as of calibration parameters of the magnetometers 20, and
      the at least one magnetic equation assuming that the magnetic field is uniform and stationary around the magnetic measurement means 20.
  the data processing means 21 can furthermore be configured to
    estimate a parameter representative of an error on the calibration parameters before and/or after the determination of the values of the calibration parameters;
    estimate a movement of said object 1.

As explained hereinabove, the object 1 can furthermore comprise a memory 22 and an interface 23.

Computer Program Product

According to a third and a fourth aspect, the invention relates to a computer program product comprising code instructions for the execution (on the processing means 21) of a method for calibrating magnetometers according to the first aspect of the invention, as well as storage means that can be read by a piece of computer equipment (for example data storage means 22) on which this computer program product is found.

The invention claimed is:

1. Method for calibrating magnetometers of an object moving in an ambient magnetic field, the method comprising:
   (a) acquiring
      by the magnetometers, at least three measured components of the magnetic field around the magnetometers, and
      by inertial measurement means which are secured to the object, an angular velocity of the object;
   (c) determining, by data processing means, values of at least one calibration parameter of the magnetometers minimising an expression defined by estimated components of the magnetic field and at least one magnetic equation relating to the angular velocity of the object,
      the estimated components of the magnetic field being a function of the measured components of the magnetic field as well as of calibration parameters of the magnetometers, and
      the at least one magnetic equation assuming that the magnetic field is uniform and stationary around the magnetic measurement means;
   wherein the magnetic equation is of the form $\dot{M}=-\omega \times M$, where M is the vector of the components of the magnetic field, and $\omega$ the angular velocity, said expression being a function of $\dot{M}^{(estimation)}+\omega_{gyro}^{(estimation)} \times M^{(estimation)}$.

2. Method according to claim 1, wherein the estimated components $M^{(estimation)}$ of the magnetic field are linked to the measured components $M^{(measurement)}$ by a model $M^{(measurement)}=A \cdot M^{(estimation)}+b_{magneto}$, where A and $b_{magneto}$ are the calibration parameters of the magnetometers.

3. Method according to claim 1, further comprising a step (b) of estimating a parameter representative of an error on the calibration parameters, the step (c) being implemented if said parameter representative of an error is greater than a predetermined threshold.

4. Method according to claim 3, further comprising a step (d) of a new estimation of said parameter representative of an error on the calibration parameters in such a way as to distinguish an external magnetic disturbance from a change in the magnetic properties of the object.

5. Method according to claim 4, further comprising, if at the end of step (d) said parameter representative of an error is less than a predetermined threshold, a step (e) of determining an attitude subset of the object for which the calibration is pertinent.

6. Method according to claim 3, wherein said parameter representative of an error on the calibration parameters is either mean of $|\dot{M}^{(estimation)}+\omega_{gyro}^{(estimation)} \times M^{(estimation)}|^2$ over a given time interval, or a spatial gradient of said components of the magnetic field.

7. Method according to claim 1, wherein step (c) comprises the implementation of a recursive filter or of an optimisation.

8. Method according to claim 1, wherein the inertial measurement means are a gyrometer, the angular velocity of the object acquired in step (a) being a measured angular velocity, and that used by the magnetic equation or equations is an estimated angular velocity according to the measured angular velocity and calibration parameters of the gyrometer, step (c) also comprising the determination of values of at least one calibration parameter of the gyrometer.

9. Method according to claim 8, wherein the estimated angular velocity $\omega_{gyro}^{(estimation)}$ of the object (1) is linked to the measured angular velocity $\omega_{gyro}^{(measurement)}$ by a model $\omega_{gyro}^{(estimation)}=D \cdot (\omega_{gyro}^{(measurement)}+b_{gyro})$, where D and $b_{gyro}$ are the calibration parameters of the gyrometer.

10. Method according to claim 1, comprising a step (f) of estimating, by the data processing means, the movement of said object according to the angular velocity of the object, measured components of the magnetic field, and values of the calibration parameters.

11. Object moving in an ambient magnetic field, comprising inertial measurement means configured to acquire an angular velocity of the object, magnetometers configured to acquire at least three components of the magnetic field, the object further comprising data processing means configured to:
   determine the values of at least one calibration parameter of the magnetometers minimising an expression defined by estimated components of the magnetic field and at least one magnetic equation relating to the angular velocity of the object,
   the estimated components of the magnetic field being a function of the measured components of the magnetic field as well as of calibration parameters of the magnetometers, and
   the at least one magnetic equation assuming that the magnetic field is uniform and stationary around the magnetic measurement means;
   wherein the magnetic equation is of the form $\dot{M}=-\omega \cdot M$, where M is the vector of the components of the magnetic field, and $\omega$ the angular velocity, said expression being a function of $\dot{M}^{(estimation)}+\omega_{gyro}^{(estimation)} \cdot M^{(estimation)}$.

12. Computer program product comprising code instructions for the execution of a method for calibrating magnetometers according to claims 1, when said program is executed on a computer.

13. Storage means readable by a piece of computer equipment whereon a computer program product comprises code instructions for the execution of a method for calibrating magnetometers according to claim 1.

* * * * *